United States Patent [19]
Bergmann

[15] 3,669,481
[45] June 13, 1972

[54] COUPLING OR LOCKING MEANS
[72] Inventor: Hermann Gustav Adolf Bergmann, Stocksund, Sweden
[73] Assignee: Liber Shovel Co. A.G., Zug, Switzerland
[22] Filed: May 23, 1969
[21] Appl. No.: 827,259

[30] Foreign Application Priority Data
May 27, 1968 Sweden..................................7065/68

[52] U.S. Cl......................................292/49, 24/211 P, 85/3, 292/53, 292/304
[51] Int. Cl........................................................E05c 3/28
[58] Field of Search..................292/49, 53, 46, 47, 170, 221, 292/227, 237, 304; 85/3, 3 K, 3 S, 66; 24/211 P, 230.1 S, 110; 287/124

[56] References Cited

UNITED STATES PATENTS

| 969,776 | 9/1910 | Foley | 292/49 X |
| 2,036,154 | 3/1936 | Littledale | 292/170 |
| 2,039,048 | 4/1936 | Agterberg | 292/221 |
| 2,117,715 | 5/1938 | Godfried | 292/237 X |
| 2,491,682 | 12/1949 | Muhlbach | 287/124 X |
| 2,494,159 | 1/1950 | Bernstein | 24/211 P X |
| 2,499,712 | 3/1950 | Armstrong | 287/103 |
| 3,312,138 | 4/1967 | Cumming | 85/66 |
| 3,126,728 | 3/1964 | Nehls | 70/169 |

FOREIGN PATENTS OR APPLICATIONS

| 431,834 | 9/1911 | France | 24/211 P |

Primary Examiner—Robert L. Wolfe
Attorney—Pierce, Scheffler & Parker

[57] ABSTRACT

In a means for coupling or locking two parts together, one part is provided with a preferably conical stud which can be inserted against a stop in a conical recess in the other part. One or preferably two or more spring actuated latching members pivotal about shafts at right angles to the axial direction of the stud are free to enter an enlarged section of the recess so that the latching members like barbs of a hook or harpoon prevent the stud from returning. An operating device rotatable or axially displaceable within the stud and actuated from one or both ends thereof effects the return of the latching members. The means may be used for coupling together two machine parts, e.g. in a chuck or the like, as a hose coupling, in a safety lock system for vehicles etc.

8 Claims, 19 Drawing Figures

INVENTOR.
Hermann Gustav Adolf Bergmann
BY
Pierre, Schiffler & Parker
Attorneys

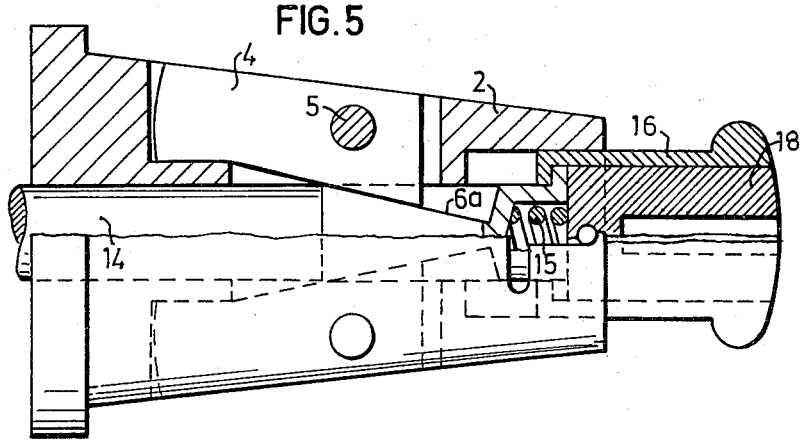
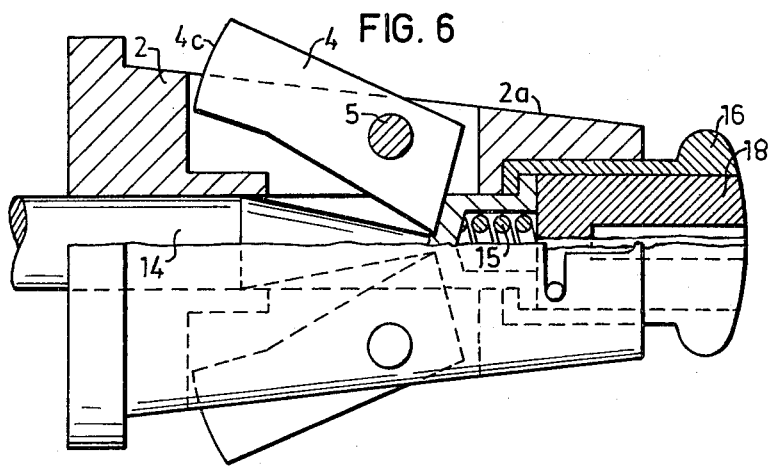

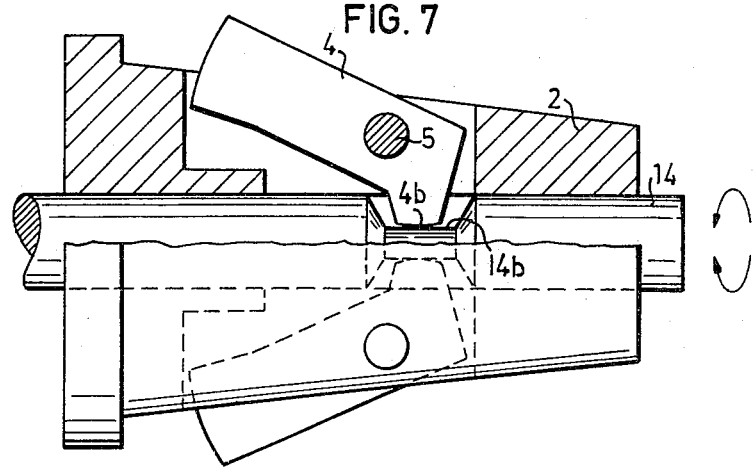
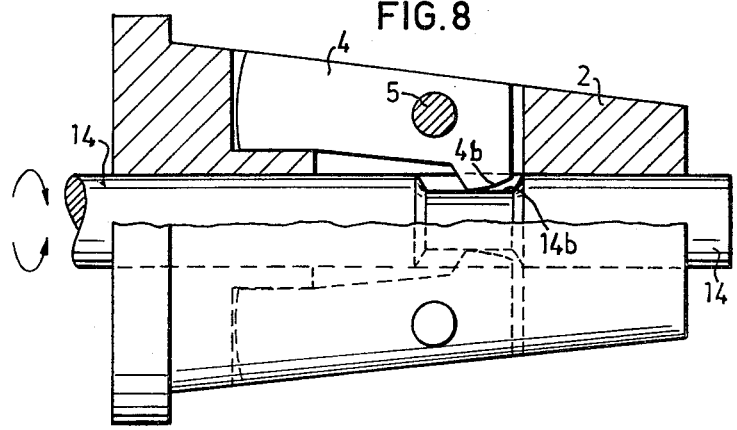

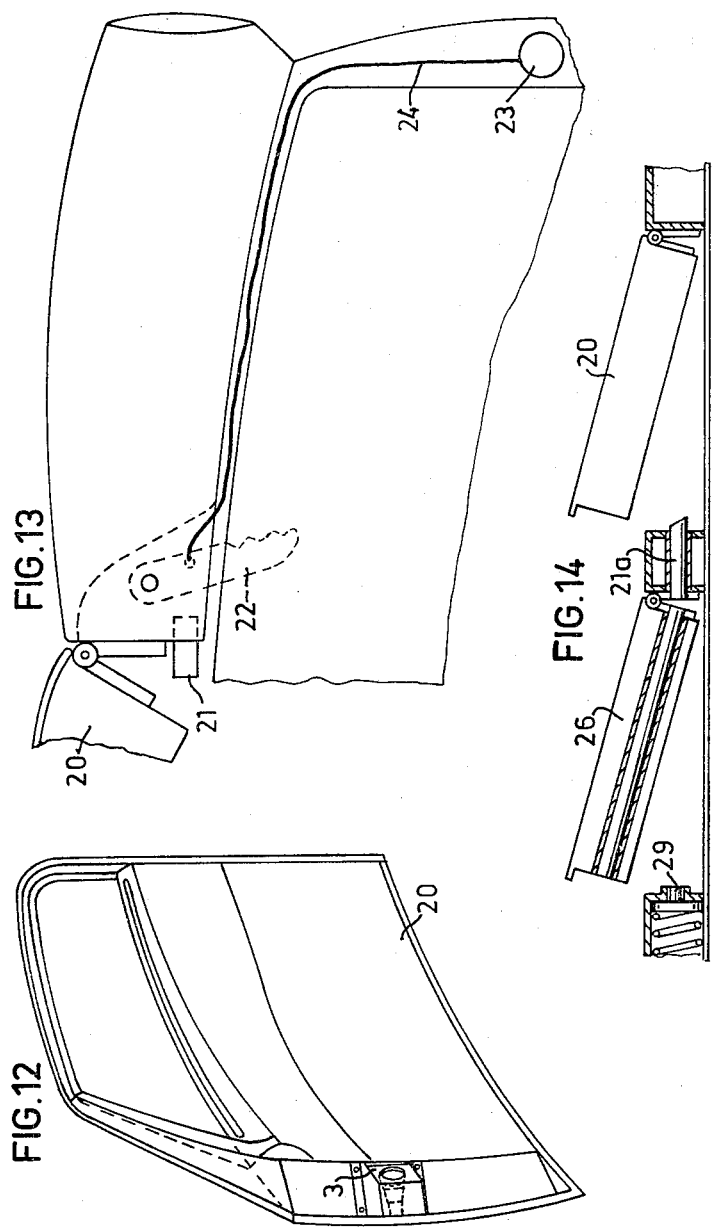

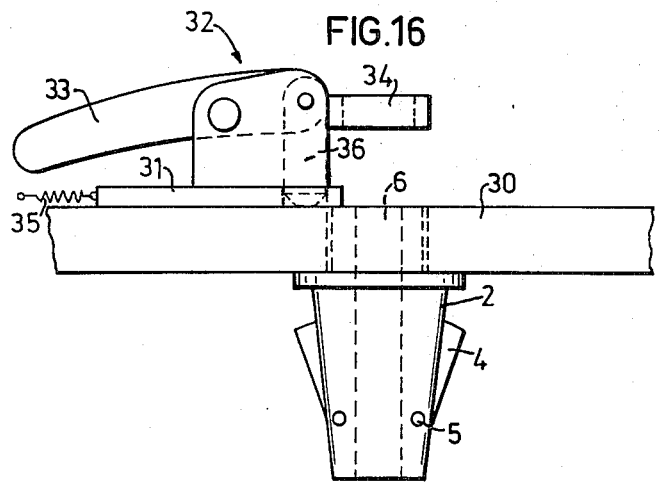
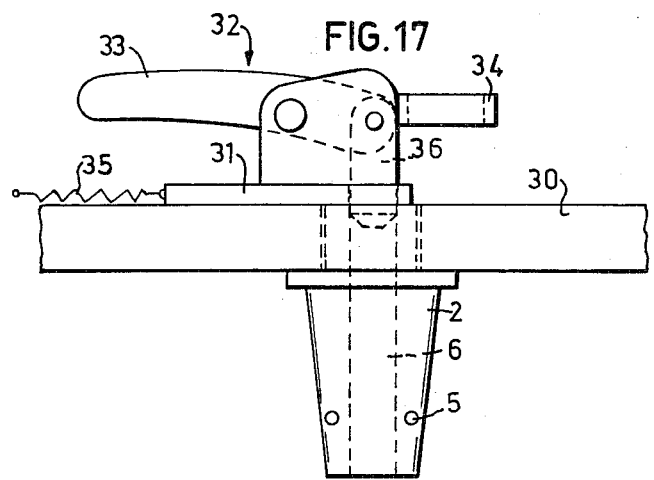
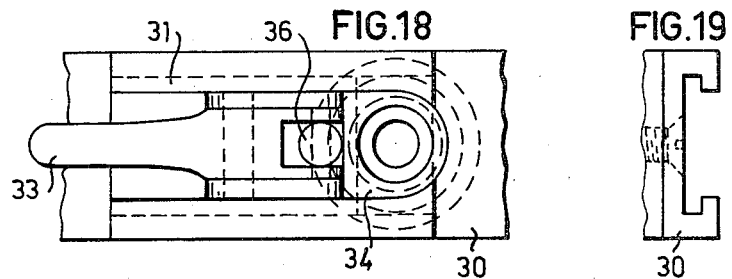

COUPLING OR LOCKING MEANS

The present invention relates to a means for coupling or locking two parts of the kind that includes a stud belonging to one part, which stud can be inserted against a stop into a locking position in a recess formed in the other part.

One purpose of the invention is to effect a coupling or locking means of the kind that, containing few elements, permits the parts to be reliably coupled together or locked, preferably automatically, when one part is moved towards the other into locked position, which means, if so desired can be reopened to release the parts by a simple rotary or displacement motion and which when necessary can be latched in a reliable manner by simple means so that the lock cannot be broken open even when great force is exerted on it.

This purpose is fulfilled by a coupling or locking means according to the invention basically in that stud presents a latching member which in locked position is arranged to move into an enlarged part of the recess and that an operating device movable within the stud and which can be actuated from either or both ends of the stud, effects the return of the latching member.

When the stud, guided by the recess, enters it, the latching member is kept at the level of the outer periphery of the stud until further relative movement between stud and recess is prevented by the stop when the latching member is free to move out into the enlarged part of the recess, the stud thereby being prevented from returning out of the recess. The parts are then kept securely connected to each other, although there may be relative turning or rotation between the parts when desired. By means of the operating device movable in the stud, however, the latching member can be returned to its inset position in the stud in a simple manner, the parts again being separable from each other.

In an advantageous embodiment of the invention, the latching member is pivotal around an axis at right angles to the axial direction of the stud. The latching member is suitably provided with a portion cooperating with the operating device and a portion in the enlarged part of the recess, which portions are on different sides of the said pivot axis. In addition, the latching member is suitably actuated by a spring outwardly from the stud. A particular advantage offered by this embodiment is that different simple types of operating devices for the latching member can be used, depending upon whether it is desired to actuate the latching member by rotation or a displacement movement in one or two directions from one or both ends of the locking or coupling means.

If it is thus desired to actuate the latching member by rotary motion, the operating device is suitably rotatably mounted in the stud and possesses a cam surface which cooperates with the latching member.

If, on the other hand, it is desired to actuate the operating device by a push button, draw-handle or the like, the operating device is suitably axially mounted in the stud so that it is axially displaceable and has a wedge-shaped guide surface that cooperates with the latching member. Two wedge surfaces facing each other could possibly be used, this being suitable in such cases where it is desired to actuate the latching member independently of the direction of displacement movement.

The recess which has an enlarged part is suitably so shaped that the latching member in locked position is limited in its movement outwardly from the stud to a position in which, what is substantially similar to an obliquely projecting barb of a hook or harpoon, engages a surface limiting the enlarged part of the recess, which surface forms an acute angle to the axial direction of the stud. The said surface is suitably so inclined that a normal towards the central part of the surface, i.e. where the central part of the stud engages it, runs through or at a short distance from the pivot axis of the latching member. In this way the means is better able to resist an attempt to break it open, as the latching member's mounting point is not subjected to any considerable breaking moment, even if great force is exerted against the stud or the part containing the recess.

The stud and the recess may be shaped according to desire but in many cases it is preferred that the stud have a conical section and the recess a conical part with substantially the same cone angle as the said section. The enlarged part of the recess may then substantially comprise a conical section having a greater cone angle than the conical section of the stud.

A coupling or locking means according to the invention, because of its simple construction containing few parts, its great reliability against attempts to break it open and the possibility of incorporating it simply, may be used for many different purposes. Thus the means may be used for rapidly and simply coupling together machine parts, e.g. in a chuck or the like. The means is particularly advantageous when it is necessary or desirable for both parts or machine elements to be mutually rotatable after being coupled together. Another suitable application of the invention is as a hose coupling, the central recess in the stud having a diameter suitable for the passage of a fluid and the facing surfaces of the stud and recessed part provided with suitable sealing means.

A particularly advantageous application of the invention is obtained if the means is included in a safety lock system especially adapted for vehicle doors, which application of the invention will be described in detail below.

Various examples of the inention's applications are shown in the accompanying drawings.

FIGS. 2–9 show sectional views of various modified embodiments of the stud included in the locking means. FIGS. 2 and 3 show an embodiment with two latching members in locked and released positions respectively.

FIGS. 4–6 show a locking means operated from one side by a draw-handle, provided with a special latching member, e.g. a cylinder lock.

FIGS. 7 and 8 show another embodiment with rotationally actuated operating elements.

FIG. 9 shows an embodiment in which the latching member is operated by pressure from one side.

FIG. 11 is a plan of a car door provided with a locking means according to the invention, while FIG. 12 shows in perspective the car door illustrated in FIG. 11.

FIGS. 13–15 show another further development of the inventive idea, applied in connection with a safety lock system for a vehicle bonnet and back doors. Finally FIGS. 16–19 illustrate still another further development of the invention applied in connection with a childproof lock, e.g. for a vehicle door.

Figure 1:
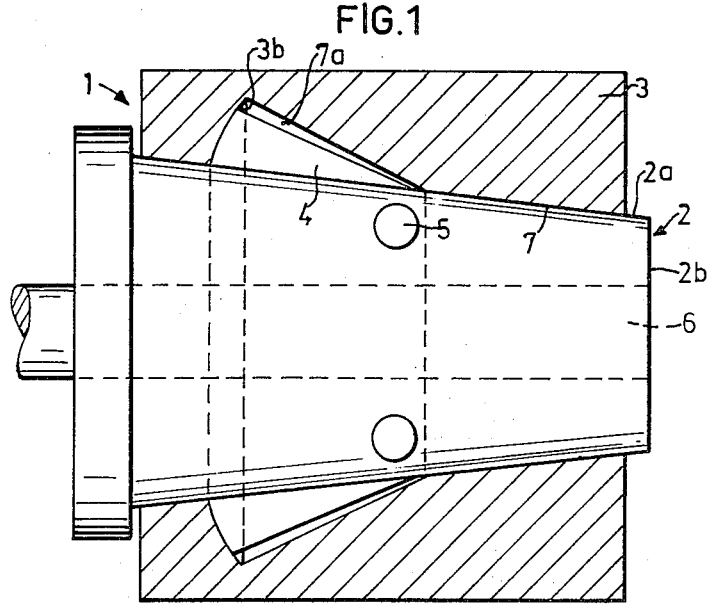
FIG. 1 shows in principle the design of a means for coupling or locking two parts according to the invention, the means being provided with a conical stud.

The general fundamental construction of an embodiment of a means 1 for coupling or locking two parts can be seen from FIG. 1. One part is provided with or includes a stud 2 which can be inserted against a stop in a recess 7 in the other part 3. In the embodiment shown, the stop is effected in that both the stud 3 and recess 7 are conical in shape and have the same conicity, but alternatively the stop may also consist of a shoulder (not shown) or a surface at right angles to the axis of the stud in the other part 3, which surface engages the end surface 2b of the stud.

When the stud 2 is inserted as far as possible in the recess 7, two symmetrical latching members 4, pivotal about shafts 5 at right angles to the axial direction of the stud, are free to enter an enlarged section 7a of the recess 7. During the actual insertion, the stud is guided by the recess (or alternatively the recessed part is guided by the stud as long as the former moves relatively to the latter), the latching members being kept pressed inwards so that their outer contour coincides with the outer contour of the stud.

Figure 2:
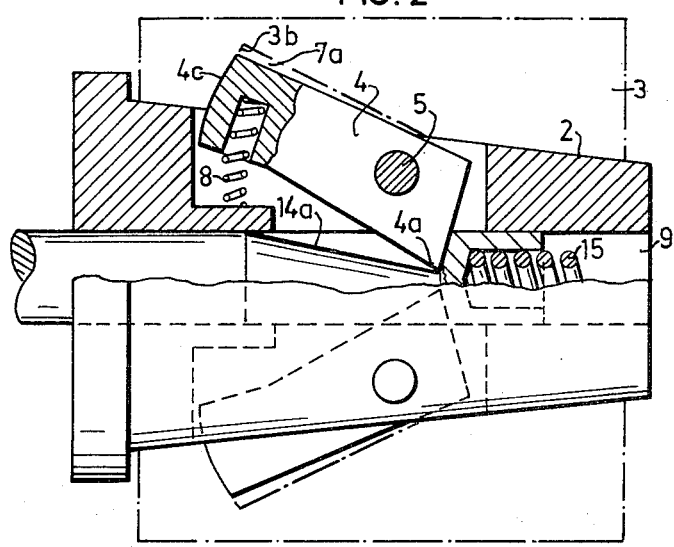

The enlarged part 7a of the recess is so shaped that each latching member 4 like a barb of a hook or harpoon is allowed to swing outwards to the latched position shown by way of example in FIGS. 1 and 2. As a whole, the stud with the latching members can be likened to a harpoon provided with three-point hooks which, when it has penetrated the recessed part, is prevented from returning by firmly engaging the surface bounding the recess.

The surface 3a which forms a rear boundary to the enlarged part 7a of the recess and which is engaged by the latching member 4, is so inclined and shaped that a normal (not shown) towards the central part of the surface cuts or falls close to the pivot axis 5 of the latching member. In this way the latching member is not subjected to any considerable breaking moment even if the stud or the recessed part is subjected to great force, the strength of the locking means thereby being considerable despite the simplicity of its construction and its small dimensions.

Figure 3:
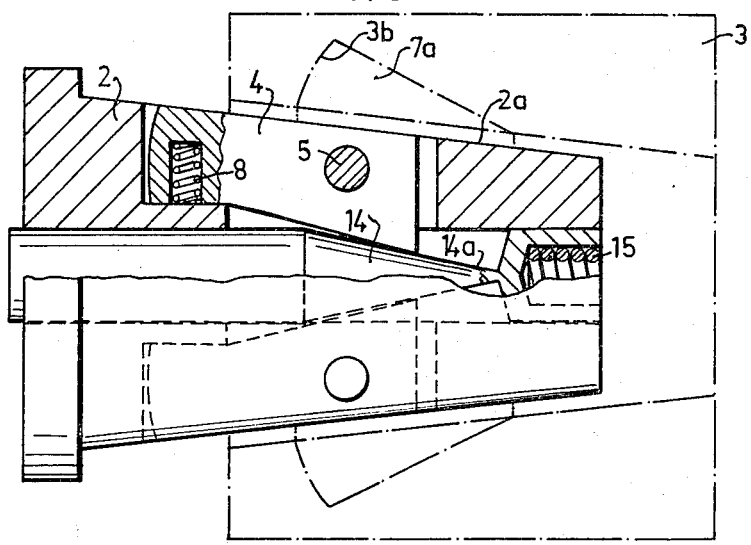

According to FIGS. 2 and 3 for example, the latching member 4 is actuated outwards by a spring 8 and cooperates with an operating device 14 which is movable in a central recess 9 in the stud 2. The design of the operating device may vary. In the embodiments shown in FIGS. 2–6, the operating device 14 is axially displaceable and has an inclined wedge or guide surface 14a which cooperates with a lower end edge 4a on the latching member. The operating device comprises a rod or a plug 14 which has the said guide surface.

In FIGS. 7 and 8 the operating device is instead rotatably mounted in the stud 2 and has a curved cam surface 14b which cooperates with an abutting surface 4b of the latching member 4. In this embodiment the return of the latching member is thus effected by a simple rotary motion of the operating device 14.

Figure 9:
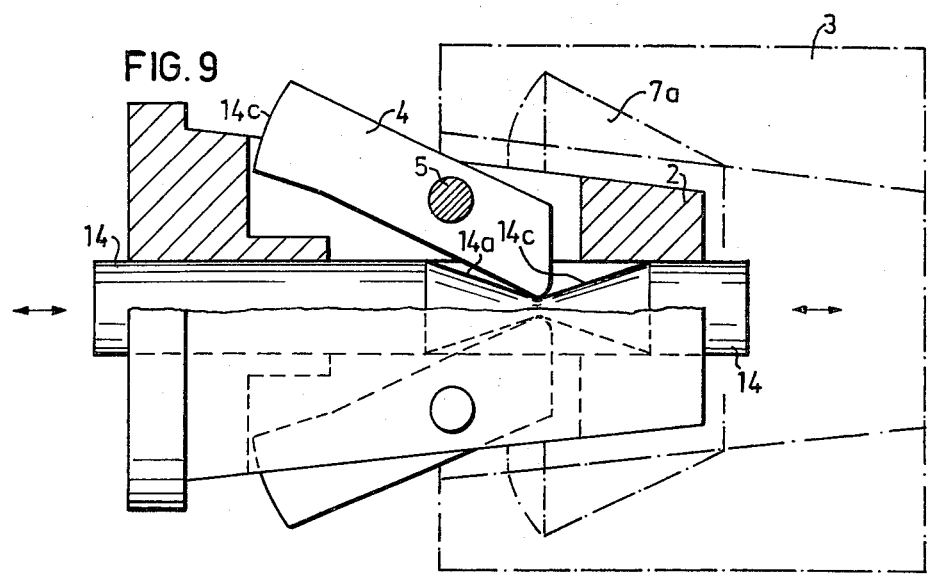

In the embodiment shown in FIG. 9 the latching member cooperates with a double wedge or guide surface 14a,14c, its function being to return the latching member to released position regardless of the displacement direction of the operating device it will be understood that the latching member 4 as shown in each of FIGS. 4 – 9 is urged outwardly in each case by spring means (not shown) similar to spring 8 as shown in FIGS. 2 and 3.

According to FIGS. 2 and 3 the operating device is actuated by a pressure spring 15 and constructed so that it can be actuated from one end.

Figure 4:
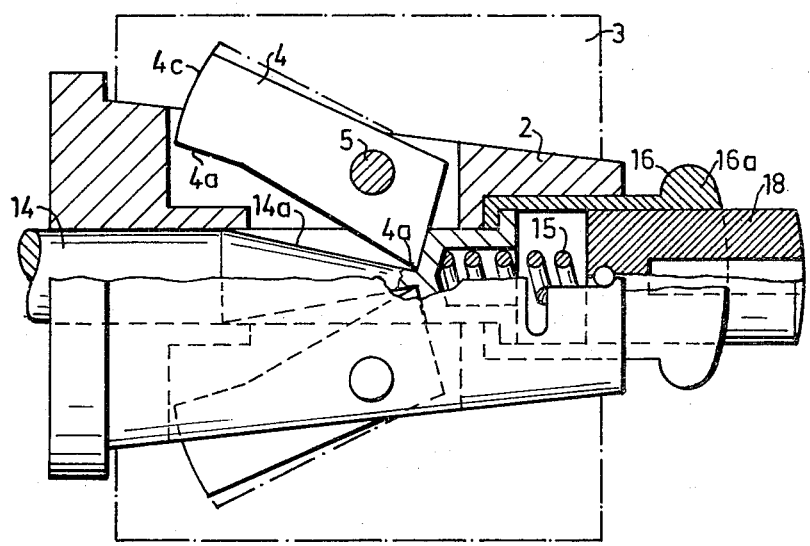

In the embodiments shown in FIGS. 4–6 the operating device is arranged to be actuated from one and both ends respectively, for which purpose the operating device cooperates with a part 16 of a handle provided with a knob 16a. This part in turn cooperates with a special locking pin 18, for example belonging to a cylinder lock. By means of the locking pin 18 the operating device 14 can be fixed so that displacement is impossible. In this way it can be ensured for instance that a locking means which can be actuated from both sides and which is latched, e.g. by a key from one side, cannot be opened from the other side. An advantageous application of this principle in connection with safety locks for automobiles will be described below.

As a rule, it is preferable for the stud 2, recess 7 and the enlarged part 7a of the recess to be conical in shape. The advantages thus gained are that the recess forms a reliable guide for the stud (and the stud for the recessed part respectively), and that in locked position the stud can be rotated relative to the recess, the recess in fact thus forming a support for the stud. It also becomes possible to facilitate the mutual rotation between the stud part and the recessed part in various ways. For example, the engagement surface 4c of the latching member can be provided with bearings or similar elements (not shown), facilitating rotation on the abutting surface. Even without such members, however, it is normally satisfactorily possible to effect mutual turning or rotation between the parts of the locking means.

If the coupling or locking means is to be used as an easily detachable hose coupling for example, the central recess 6 (FIG. 1) in the stud part 2 has a greater diameter to permit the desired passage of a fluid. In such a case one or more additional operating devices for the latching member may be arranged radially outside the central recess in the stud part. Further special demands for accuracy are then placed on the conical surfaces so that reliable sealing can be effected. Special sealing elements such as O-rings or the like may possibly be fixed on the stud and/or in the recess. In such an embodiment both the parts can be pressed towards each other, e.g. by a spring or some other method, to obtain reliable sealing.

Figure 10:
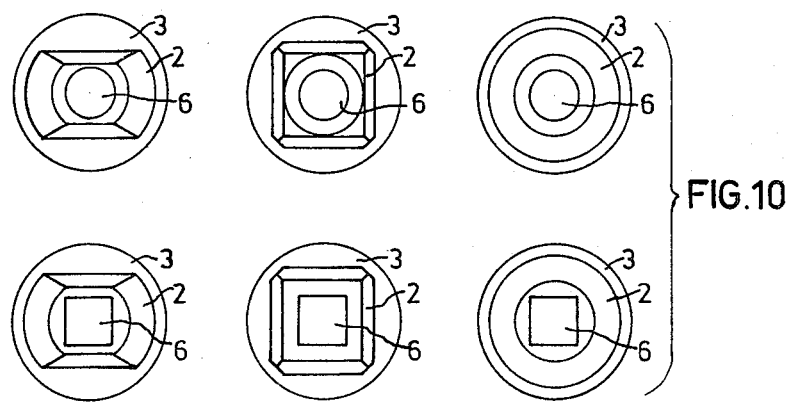
FIG. 10 illustrates some examples of the shape of the profile of recess and locking stud.

If it is necessary or desirable for the parts not to be rotatable in relation to each other, this can be effected by suitable construction of the cross-section surfaces of the stud and recess. Some examples of this are shown in FIG. 10.

Figure 11:
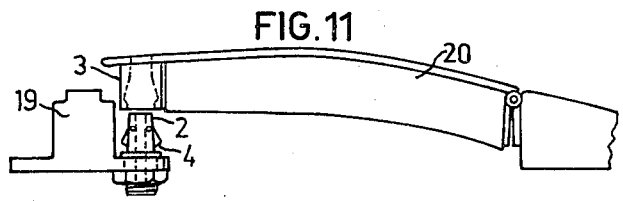

FIGS. 11 and 12 show a locking means according to the invention applied as a safety lock for a car door. The car door 20 contains the recessed part 3 while the stud part 4 with the associated latching member is arranged on the door frame 19. A suitable alternative described above for actuating the operating device can be chosen. In practice a double guide surface on the operating plug is normally preferred in accordance with FIG. 9, this permitting push button operation from one side or the other. In addition, a safety lock arrangement for the operating device, actuated from the desired side, is suitably arranged. Particular advantages can be obtained, however, if the locking means of the invention cooperates with a safety device so constructed that when it is locked by a key from outside the car, the door cannot be opened from the inside. In this case, an unauthorized person wishing to enter the vehicle must break a window, but despite this is not able to open the safety lock from the inside. It is therewith desirable for the outside of the car door to contain only one keyhole, while handles and similar projecting parts, on which force can be exerted, are avoided.

FIGS. 13–15 illustrate how a safety lock system for a vehicle such as an automobile can be constructed starting from a locking means according to the invention. By means of the construction described above, in which it is not possible to open from the inside a vehicle door locked from the outside, it is possible to interlock, e.g. bonnet, boot and, where necessary, back doors. All the interlocking devices are dependent on the front door being kept latched with no possibility of opening it from the inside.

FIG. 13 thus illustrates how closing a front door 20 provided with a locking means according to the invention (not shown) causes actuation of a stud 21 which in turn prevents actuation of a handle 22 in the vehicle. When the handle 22 is latched, a forward locking means 23 for the bonnet cannot be opened via the cable 24. An arrangement of this kind within the engine housing may suitably contain means which make it impossible to start and drive as long as the vehicle door cannot be opened. In this way the present steering wheel, ignition, gear lever etc. locks can be dispensed with.

FIGS. 14 and 15 illustrate how a displaceable locking stud 21a operating in a similar manner is interlocked when the front door 20 is closed. The locking stud 21a clamps a latching rod 27 which is included in a recess 28 in the door frame during displacement of a spring actuated pin 29 which returns the latching rod 27 to released position when the front door 20 is opened.

FIGS. 16–18 show an application of the invention as a child-proof lock, e.g. for a rear door of a vehicle. The locking stud 2 with the latching member 4 is attached to a door 30. The door has a guide 31 (FIG. 19) for a handle part 32 having a pivotal handle grip 33 and a handle 34 intended for displacement of the handle part. The door can only be opened after the part 32 has been displaced against the action of a spring 35 into the guide 31 so that a pin 36 linked to the grip 33 can enter the recess 6 of the stud part 2 of the locking means so that displacement of the operating device (not shown) of the latching member 4 is permitted. In this further development of the invention both displacement and rotary motion of the handle part are required to open the locking means of the invention.

Applied to a car door, a locking means according to the invention whether used separately or as part of a safety system of the type described above can be built in in such a manner that it forms a powerful part of the actual bodywork, unaffected by force. In this application as vehicle lock, the locking means presents not only simplicity and robust construction with few parts but the further advantages of being simple to build into all vehicles and easy to cooperate with other devices making it impossible to start and drive while the locking means itself cannot be opened in the normal manner.

As has been seen, however, the principle of a coupling and locking means according to the invention may have many other applications where it is desired rapidly, simply and safely to connect two parts.

What I claim is:

1. A fastening assembly for releasably fastening two elements together, comprising a first element having a tapered stud member, an operating member extending longitudinally through said stud member and movable therein, said stud member being provided with at least one recess communicating with said operating member and the outside of said stud member, at least one latching member cooperating with said operating member, said recess being adapted to receive substantially the entire latching member when in the released position, a second element provided with a tapered opening to receive said tapered stud member of said first element, the tapered walls of said tapered opening being provided with a conical recess for receiving said at least one latching member when it protrudes from the at least one recess in said stud member, said operating member including a surface of varying cross sectional area, means for urging said at least one latching member into a latching position by moving said at least one latching member into the conical recess in the tapered wall of the tapered opening by slidably engaging said surface of varying cross sectional area of said operating member.

2. A fastening assembly as claimed in claim 1 wherein said means for urging said at least one latching member into the latching position comprises spring means whereby, when said operating member is actuated, said at least one latching member will be returned to the released position in the at least one recess in said stud member against the action of said spring means.

3. A fastening assembly as claimed in claim 1 and further comprising at least one pivot mounted in the at least one recess of said stud member, the axis of said at least one pivot being transverse to and spaced from the axis of said operating member, said at least one latching member being mounted on said at least one pivot, and spring means urging said at least one latching means about said pivot.

4. A fastening assembly as claimed in claim 3 wherein the outer surface of the conical recess in the tapered wall of the tapered opening in said second element with which said at least one latching member engages when in the latching position forms an angle to the axis of said operating member such that a normal thereto extends substantially through said pivot.

5. A fastening assembly as claimed in claim 3 wherein the surface of varying cross sectional area of said operating member forms a double conical wedge-shaped surface and the operating member may be actuated in either axial direction to move said at least one latching member to the released position.

6. A fastening assembly as claimed in claim 1 wherein the surface of carying cross sectional area of said operating member constitutes a cam surface and the operating member may be rotated about its axis to move said at least one latching member to the released position.

7. A fastening assembly as claimed in claim 1 and further comprising roller bearings between the engaging surface of the at least one latching member and the outer surface of the conical recess in the tapered wall of the tapered opening in said second element to facilitate relative movement therebetween.

8. A fastening assembly for releasably fastening two elements together, comprising a first element having a stud member, an operating member extending longitudinally through said stud member and movable therein, said stud member being provided with at least one recess communicating with said operating member and the outside of said stud member, at least one latching member cooperating with said operating member, said recess being adapted to receive substantially the entire latching member when in the released position, a second element provided with a tapered opening to receive said tapered stud member of said first element, the tapered walls of said tapered opening being provided with at least one recess for receiving said at least one latching member when it protrudes from the at least one recess in said stud member, said operating member including a surface having double-conical wedge shape, whereby the operating member may be actuated in either axial direction to move said at least one latching member to the released position, means for urging said at least one latching member into a latching position by moving said at least one latching member into the at least one recess in the tapered wall of the tapered opening by slidably engaging said surface of said operating member.

* * * * *